US012724207B2

(12) United States Patent
Elkins, II et al.

(10) Patent No.: US 12,724,207 B2
(45) Date of Patent: Sep. 1, 2026

(54) METHODS OF OPTICAL FIBER RESHAPING FOR DIRECT LOCKING OPTICAL FIBERS AND CORRECTING CORE-TO-FERRULE ECCENTRICITY ERRORS

(71) Applicant: CORNING RESEARCH & DEVELOPMENT CORPORATION, Corning, NY (US)

(72) Inventors: Robert Bruce Elkins, II, Hickory, NC (US); Ming-Jun Li, Horseheads, NY (US); Ying Liu, Painted Post, NY (US); Lei Yuan, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 280 days.

(21) Appl. No.: 18/241,534

(22) Filed: Sep. 1, 2023

(65) Prior Publication Data

US 2024/0111101 A1 Apr. 4, 2024

Related U.S. Application Data

(60) Provisional application No. 63/411,793, filed on Sep. 30, 2022.

(51) Int. Cl.
*G02B 6/38* (2006.01)
*G02B 6/44* (2006.01)

(52) U.S. Cl.
CPC ......... *G02B 6/3838* (2013.01); *G02B 6/3843* (2013.01); *G02B 6/3851* (2013.01); *G02B 6/4434* (2013.01)

(58) Field of Classification Search
CPC ............................ G02B 6/3833; G02B 6/4434
See application file for complete search history.

(56) References Cited

U.S. PATENT DOCUMENTS 6,742,936 B1 6/2004 Knecht et al.
7,013,073 B2 3/2006 Cheng et al.
9,645,313 B2 5/2017 Akarapu et al.
9,880,362 B2 1/2018 Danley et al.
9,885,843 B2 2/2018 Bhagavatula et al.
10,071,497 B2 9/2018 Gregorski
11,280,967 B2 3/2022 Boben et al.
11,420,293 B2 8/2022 Bookbinder et al.
2004/0052476 A1* 3/2004 Houmault ................ G02B 6/32 385/33
2010/0247048 A1* 9/2010 Ooizumi ........... C03B 37/01211 385/127
2019/0346648 A1* 11/2019 Pausan ................. G02B 6/4434
2021/0389524 A1 12/2021 Bauco et al.
2022/0043218 A1* 2/2022 Borrelli .................. C03C 27/10

FOREIGN PATENT DOCUMENTS

WO 2013/126429 A2 8/2013
WO 2015/068122 A1 5/2015
WO 2018/093857 A1 5/2018

* cited by examiner

*Primary Examiner* — Eric Wong
(74) *Attorney, Agent, or Firm* — Kapil U. Banakar

(57) ABSTRACT

The present disclosure relates to laser treatment of an optical fiber to secure the optical fiber within a ferrule bore. In particular, the laser treatment modifies the physical structure of the optical fiber to aid in securing the optical fiber within the ferrule bore and to correct core-to-ferrule eccentricity errors.

29 Claims, 13 Drawing Sheets

10
24
20
28
12
14
22

16
10
24
26
18
12
14
20

22

106
25
17
14
19
15
16
B
21
B1
13
L
12

11
17
13
15
21
19
P
25
16
C
14
12

25
19
14
16
A2
17
B
21
13
A1
L
12

106
15
13
17
11
21
19
A2
14
12
C
16
A1
25

METHODS OF OPTICAL FIBER RESHAPING FOR DIRECT LOCKING OPTICAL FIBERS AND CORRECTING CORE-TO-FERRULE ECCENTRICITY ERRORS

PRIORITY APPLICATION

This application claims the benefit of priority of U.S. Provisional Application No. 63/411,793, filed on Sep. 30, 2022, the content of which is relied upon and incorporated herein by reference in its entirety.

FIELD

The present disclosure relates to optical fiber cable assemblies, and in particular relates to methods of optical fiber reshaping for securing optical fibers within ferrules used in optical fiber connectors.

BACKGROUND

Optical fiber connectors ("connectors") are devices used to optically connect one optical fiber to another, or to connect an optical fiber to another device such as an optical transmitter or an optical receiver. An optical fiber cable typically carries the optical fiber, which has relatively high-index core section in which most of the light is carried, and a surrounding relatively low-index cladding section that surrounds the core. A ferrule in the connector supports a bare end section of the optical fiber. The bare end section has a polished end face that coincides with a planar front face of the ferrule. The connector and the optical fiber cable constitute a cable assembly.

When assembling optical fiber connectors, optical fibers are inserted into bores of ferrules, and a bonding agent is used to secure the optical fibers within ferrules. In particular, in some instances, the bonding agent is stored within the ferrule, but in other instances, the bonding agent is injected into the ferrule when the optical fiber is inserted. To insert the optical fiber, the ferrule is heated to expand the ferrule and ferrule bore and to melt a portion of the bonding agent (that is either already stored within the ferrule bore or injected into the ferrule bore). While the ferrule is expanded, the optical fiber is inserted through the ferrule bore and the bonding agent. Then, the ferrule cools to room temperature, thereby, contracting the ferrule, and locking the optical fiber within the ferule.

The above described process has manufacturing and operating costs associated with the processing steps outlined above and the raw material costs of the bonding agent. It would be advantageous to reduce these costs while still effectively inserting optical fibers within ferrules.

SUMMARY

The present disclosure relates to laser treatment of an optical fiber to secure the optical fiber within a ferrule bore. In particular, the laser treatment modifies the physical structure of the optical fiber to aid in securing the optical fiber within the ferrule bore and to correct core-to-ferrule eccentricity errors.

In one embodiment, a ferrule assembly is provided. The ferrule assembly comprising: a ferrule having a front end, a rear end, and a ferrule bore extending between the front end and the rear end, wherein at least a portion of the ferrule bore comprises a micro-bore, and an optical fiber inserted into the micro-bore to define an annular gap between an outer surface of the optical fiber and an inner surface of the micro-bore, the optical fiber comprising at least one protrusion extending from the outer surface of the optical fiber; wherein the at least one protrusion extends through the annular gap and contacts the inner surface of the micro-bore.

In another embodiment, the at least one protrusion applies a force onto the inner surface of the micro-bore such that the optical fiber has a pull force of at least 2 pounds-force (lbf) as measured by IEC61753. In another embodiment, the at least one protrusion comprises a plurality of protrusions spaced apart from each other by 90 degrees along a circumference of the outer surface. In another embodiment, the at least one protrusion comprises a plurality of protrusions that spans a circumference of the inner surface. In another embodiment, at least one of the at least one protrusion is outside the micro-bore. In another embodiment, the at least one of the at least one protrusion is outside the ferrule. In another embodiment, the at least one protrusion has a height ranging between 100 nm and 800 nm relative to the outer surface of the optical fiber. In another embodiment, the optical fiber includes an inner cladding and an outer cladding, wherein the inner cladding has a hydroxyl concentration ranging between 0 ppm and 25 ppm, and wherein the outer cladding has a hydroxyl concentration ranging between 10 ppm and 1200 ppm. In another embodiment, the ferrule assembly is housed within a housing and a connector body.

In one embodiment, a method of terminating an optical fiber with a ferrule, wherein the ferrule having a front end, a rear end, and a ferrule bore extending between the front end and the rear end, wherein at least a portion of the ferrule bore defines a micro-bore is provided. The method comprising: inserting the optical fiber into the micro-bore; and applying a laser treatment onto the optical fiber to create at least one protrusion along an outer surface of the optical fiber, wherein the at least one protrusion contacts an inner surface of the micro-bore.

In another embodiment, the inserting the optical fiber into the micro-bore defines an annular gap between the outer surface of the optical fiber and the inner surface of the micro-bore, and wherein applying the laser treatment results in the at least one protrusion extending through the annular gap. In another embodiment, wherein the at least one protrusion comprises a plurality of protrusions spaced apart from each other by 90 degrees along a circumference of the outer surface. In another embodiment, the at least one protrusion comprises a plurality of protrusions that spans a circumference of the outer surface. In another embodiment, the at least one protrusion has a height ranging between 100 nm and 800 nm relative to the outer surface of the optical fiber. In another embodiment, the optical fiber includes an inner cladding and an outer cladding, wherein the inner cladding has a hydroxyl concentration ranging between 0 ppm and 25 ppm, and wherein the outer cladding has a hydroxyl concentration ranging between 10 ppm and 1200 ppm. In another embodiment, the method further comprising: heating the ferrule such that the micro-bore expands, wherein the inserting of the optical fiber occurs after heating; cooling the ferrule such that the micro-bore contracts onto the at least one protrusion. In another embodiment, the laser treatment comprises: irradiating one or more locations on the optical fiber with a laser beam having a wavelength ranging between 1 micron and 5 microns. In another embodiment, the laser beam has a power output ranging between 1 W and 50 W. In another embodiment, the optical fiber is secured to the ferrule after the at least one protrusion contacts the micro-bore of the ferrule to form a terminated assembly, the terminated assembly having a pull force of at least 2 pounds-force (lbf) as measured by IEC61753.

In one embodiment, a method of terminating an optical fiber having an inner core with a ferrule having a micro-bore and an end face with a mating location is provided. The method comprising: determining a bore bearing angle of a bore offset of the micro-bore in the ferrule at the end face relative to a reference axis of the ferrule; determining a core bearing angle of a core offset of the inner core in the optical fiber at an end of the optical fiber relative to a reference axis of the optical fiber; orienting the ferrule and the optical fiber relative to each other so that the reference axis of the ferrule and the reference axis of the optical fiber are substantially aligned and so that the bore bearing angle and the core bearing angle are arranged about 180 degrees apart; heating the ferrule at a processing temperature above room temperature; inserting the optical fiber into the micro-bore of the ferrule when the ferrule is at the processing temperature, wherein a distance exists between a center of the inner core of the optical fiber and the mating location of the ferrule; applying a laser treatment onto the optical fiber to reduce the distance between the inner core of the optical fiber and the mating location of the ferrule, wherein the optical fiber is altered by the laser treatment; and coupling the optical fiber to the micro-bore of the ferrule.

In another embodiment, the applying a laser treatment step occurs after the inserting step. In another embodiment, orienting the ferrule and the optical fiber relative to each other further comprises: fixing the orientation of the optical fiber; and rotating the ferrule about a longitudinal axis of the ferrule. In another embodiment, orienting the ferrule and the optical fiber relative to each other comprises: fixing the orientation of the ferrule; and rotating the optical fiber about a longitudinal axis of the optical fiber. In another embodiment, orienting the ferrule and the optical fiber relative to each other comprises rotating the ferrule and the optical fiber about the respective central axes of the ferrule and the optical fiber. In another embodiment, the step of orienting the ferrule and the optical fiber relative to each other occurs before the step of inserting the optical fiber into the micro-bore. In another embodiment, the step of orienting the ferrule and the optical fiber relative to each other occurs after the step of inserting the optical fiber into the micro-bore. In another embodiment, the altering step comprises creating at least one protrusion on the outer surface of the optical fiber, wherein the at least one protrusion engages with an inner surface of the micro-bore. In another embodiment, the ferrule is housed within a housing and a connector body after the optical fiber is coupled to the ferrule.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

In the discussion below, the term "cylindrical" is not limited to body having a strictly circular cross-sectional shape and can include other cross-sectional shapes.

Also, in the discussion below, the term "core-ferrule eccentricity" can also be referred to as the "coaxiality," and the concentricity error can be referred to as a "coaxial error" or the "coaxiality error."

And in this disclosure, any ranges of values include the stated end points of the range. For example, a range that is stated as being between A and B, or from A to B, with A and B being numerical values, includes both A and B in the stated range.

In general, the present disclosure relates to laser treatment of an optical fiber to secure the optical fiber within a ferrule bore. In particular, the laser treatment modifies the physical structure of the optical fiber to aid in securing the optical fiber within the ferrule bore and to correct core-to-ferrule eccentricity errors.

Figures 1, 2:
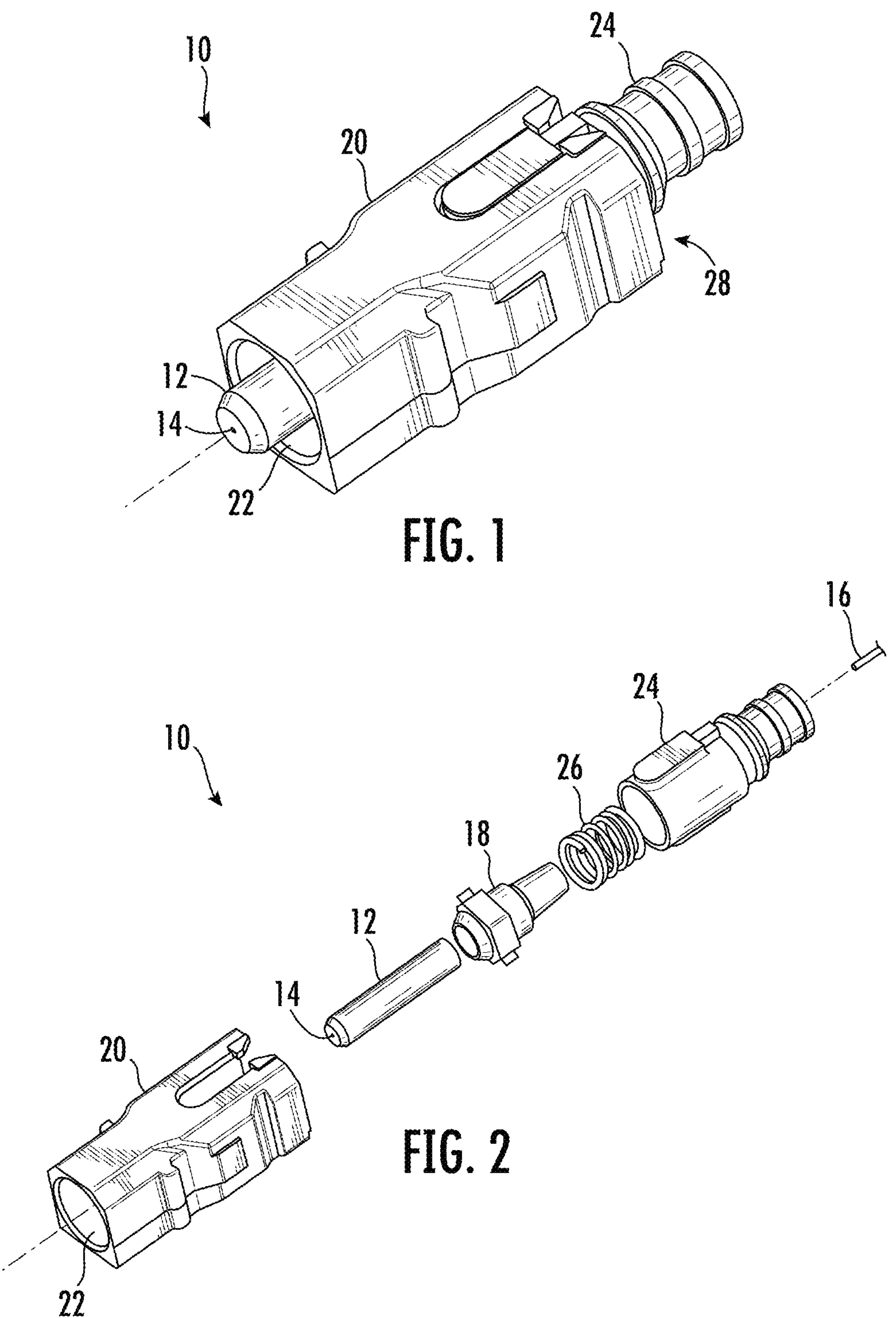
FIG. 1 is a perspective view of an exemplary fiber optic connector.
FIG. 2 is an exploded perspective view of the fiber optic connector shown in FIG. 1.

Referring first to FIGS. 1 and 2, an exemplary fiber optic connector 10 used in many modern fiber optic networks is shown. Although the fiber optic connector 10 is shown in the form of a SC-type connector, the features may be applicable to different connector designs. This includes ST, LC, and MU-type connectors, for example, and other single-fiber or multi-fiber connector designs. As shown in these figures, the connector 10 includes a ferrule 12 having a ferrule bore 14 ("micro-bore") configured to support an optical fiber 16, a ferrule holder 18 from which the ferrule 12 extends, a housing 20 having a cavity 22 in which the ferrule 12 and ferrule holder 18 are received, and a connector body 24 configured to cooperate with the housing 20 to retain the ferrule 12 and ferrule holder 18 within the housing 20. More specifically, a back end of the ferrule 12 is received in a first portion of the ferrule holder 18 and is secured therein in a known manner (e.g., press-fit, adhesive, molding the ferrule holder 18 over the back end of the ferrule 12, etc.). The ferrule 12 and ferrule holder 18 may even be a monolithic structure in some embodiments. The ferrule holder 18 is biased to a forward position within the housing 20 by a spring 26, which extends over a second portion of the ferrule holder 18 that has a reduced cross-sectional diameter/width compared to the first portion. The spring 26 also interacts with internal geometry of the connector body 24, which may be secured to the housing 20 using a snap-fit or the like. For example, FIGS. 1 and 2 illustrate a rear portion of the housing 20 having cut-outs or slots on opposite sides so as to define a split shroud. The connector body 24 has tabs configured to be snapped into the slots and retained therein due to the geometries of the components.

When the connector 10 is assembled as shown in FIG. 1, a front end of the ferrule 12 projects beyond a front end of the housing 20. The ferrule end face presents the optical fiber 16 for optical coupling with a mating component (e.g., another fiber optic connector; not shown), such as an adapter. Thus, when the fiber optic connector 10 is mated with the other component, the optical fiber(s) 16 in the ferrule 12 can be held in alignment with the optical fiber(s) 16 of the mating ferrule 12 to establish an optical connection.

While optical fiber(s) 16 of mated ferrules are held in alignment for the purposes of establishing an optical connection, optical fiber(s) are also held in place within ferrule 12 for alignment within connector 10 itself. In particular, optical fiber(s) 16 interact with micro-bore 14 of ferrule 12 such that optical fiber(s) 16 are secured within ferrule 12, and as discussed in greater detail herein, optical fiber 16 is laser treated such that the surface properties of optical fiber 16 is altered, whereby the altered optical fiber(s) 16 contact micro-bore 14 to lock optical fiber(s) 16 within ferrule 12 via an interference fit.

Optical Fiber 16

The methods and assemblies described herein can be used with different types of optical fibers. Referring to FIG. 2B, optical fiber(s) 16 includes a core 27 and a cladding surrounding the core 27. As shown, the cladding of optical fiber 16 includes an inner cladding 28 surrounding the core 27 and an outer cladding 29 surrounding the inner cladding 28. As also shown, core 27 has a radius R1, inner cladding 28 has a radius R2, and outer cladding 29 has a radius R3. In some embodiments, the ratio of radius R1 to radius R2 is less than 0.33, less than 0.3, or less than 0.2. In some embodiments, the ratio of radius R1 to radius R3 is less than 0.12, less than 0.1, or less than 0.08.

The core 27, inner cladding 28, and outer cladding 29 are composed of materials with an appropriate refractive index differential to provide desired optical characteristics. In particular, in some embodiments, core 27, inner cladding 28, and outer cladding 29 have varied hydroxyl (OH) concentrations distributed through these components of optical fiber 16. In some embodiments, core 27 has a hydroxyl concentration ranging between 0 parts per million (ppm) and 25 ppm, between 0 ppm and 15 ppm, or between 0 ppm and 10 ppm. In some embodiments, inner cladding 28 has a hydroxyl concentration ranging between 0 parts per million (ppm) and 25 ppm, between 0 ppm and 15 ppm, or between 0 ppm and 10 ppm. In some embodiments, outer cladding 29 has a hydroxyl concentration ranging between 10 parts per million (ppm) and 1200 ppm, between 10 ppm and 1100 ppm, or between 10 ppm and 1000 ppm.

In some embodiments, the cladding (or outer cladding) is a titania-doped cladding to provide improved surface characteristics to optical fiber 16. Examples of optical fibers with such a construction are disclosed in U.S. Pat. No. 5,318,613, the disclosure of which is hereby incorporated by reference. For example, in one embodiment, the cladding (or outer cladding) comprises silica doped with titania ($TiO_2$—$SiO_2$) with varying titania concentrations. In some embodiments, the cladding (or outer cladding) has a titania concentration between 4 wt. % and 20 wt. %, between 4 wt. % and 16 wt. %, between 6 wt. % and 14 wt. %, or between 8 wt. % and 12 wt. % based on the total weight of the cladding (or the outer cladding). The cladding (or outer cladding) may have a thickness between 1 micron and 20 microns, between 2 microns and 15 microns, or between 2 microns and 10 microns. In some embodiments, optical fiber 16 may be a bend insensitive fiber.

Ferrule Assembly 25

Referring now to FIGS. 3A-5B, detailed views of ferrule assemblies 25 are shown. Ferrule assemblies 25 comprise a ferrule 12 with optical fiber 16 inserted into micro-bore 14 along longitudinal axis B of micro-bore 14. With regards to FIGS. 3A-5B, ferrule assemblies 25 are shown after laser treatment, the conditions of which are discussed in greater detail below.

Figure 2A:
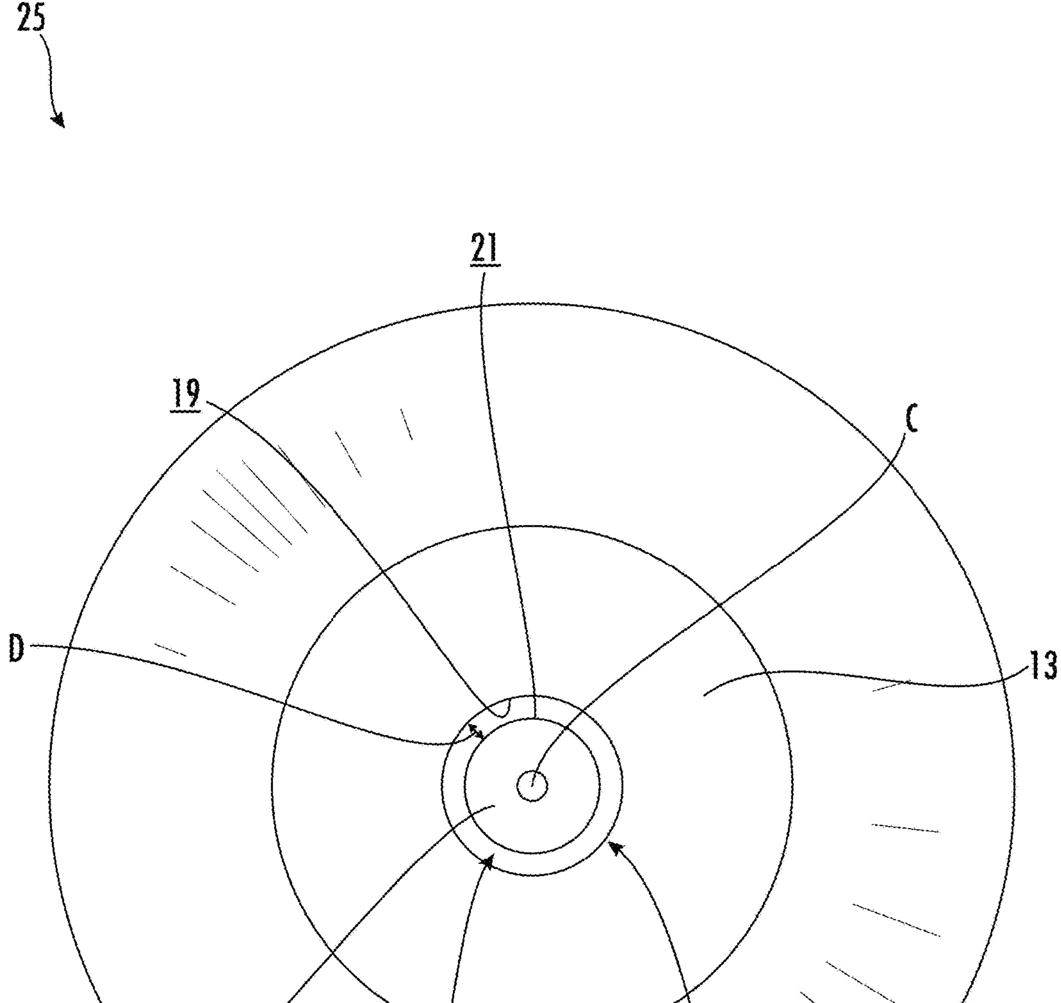
FIG. 2A is a top view of a ferrule assembly of the exemplary fiber optic connector of FIG. 1 having an optical fiber inserted within a ferrule bore of the ferrule.
Figure 2B:
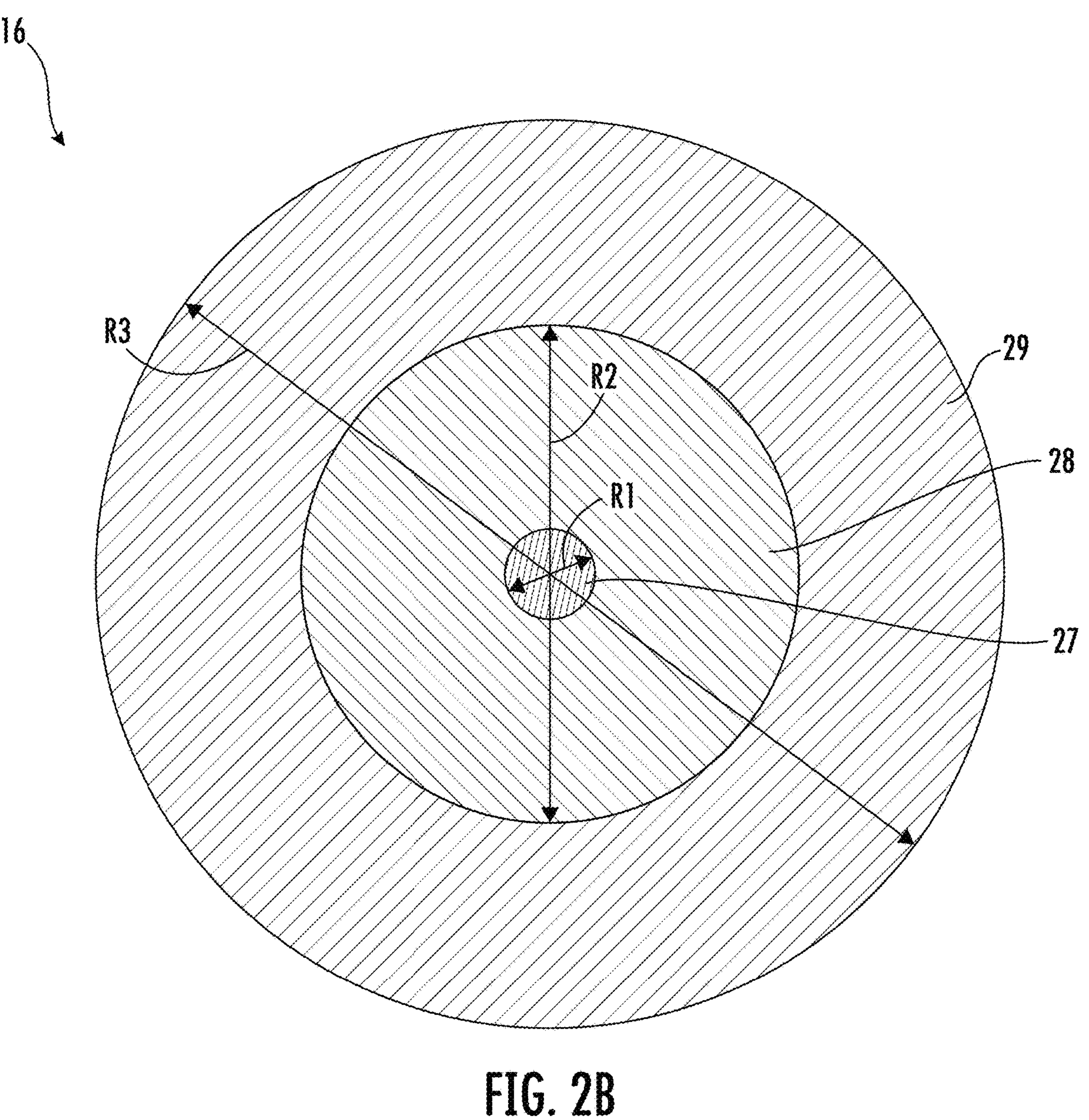
FIG. 2B is a front view of the optical fiber of FIG. 2A inserted into the ferrule bore of the ferrule.

Referring briefly to FIG. 2A, a standard ferrule assembly 25 is shown where ferrule 12 has optical fiber 16 inserted into micro-bore 14. As shown, optical fiber 16 is positioned within micro-bore 14 of ferrule 12 such that an annular gap 15 exists between an inner surface 19 of micro-bore 14 and an outer surface 21 of optical fiber 16. In some embodiments, annular gap 15 spans a distance D ranging between 200 nanometers (nm) and 500 nm from outer surface 21 of optical fiber 16 and inner surface 19 of micro-bore 14. By comparison, ferrules 12 as shown in FIGS. 3A-6B have a reduced annular gap 15 due to the change in surface properties by laser treatment as discussed in greater detail below.

Figures 3A, 3B:
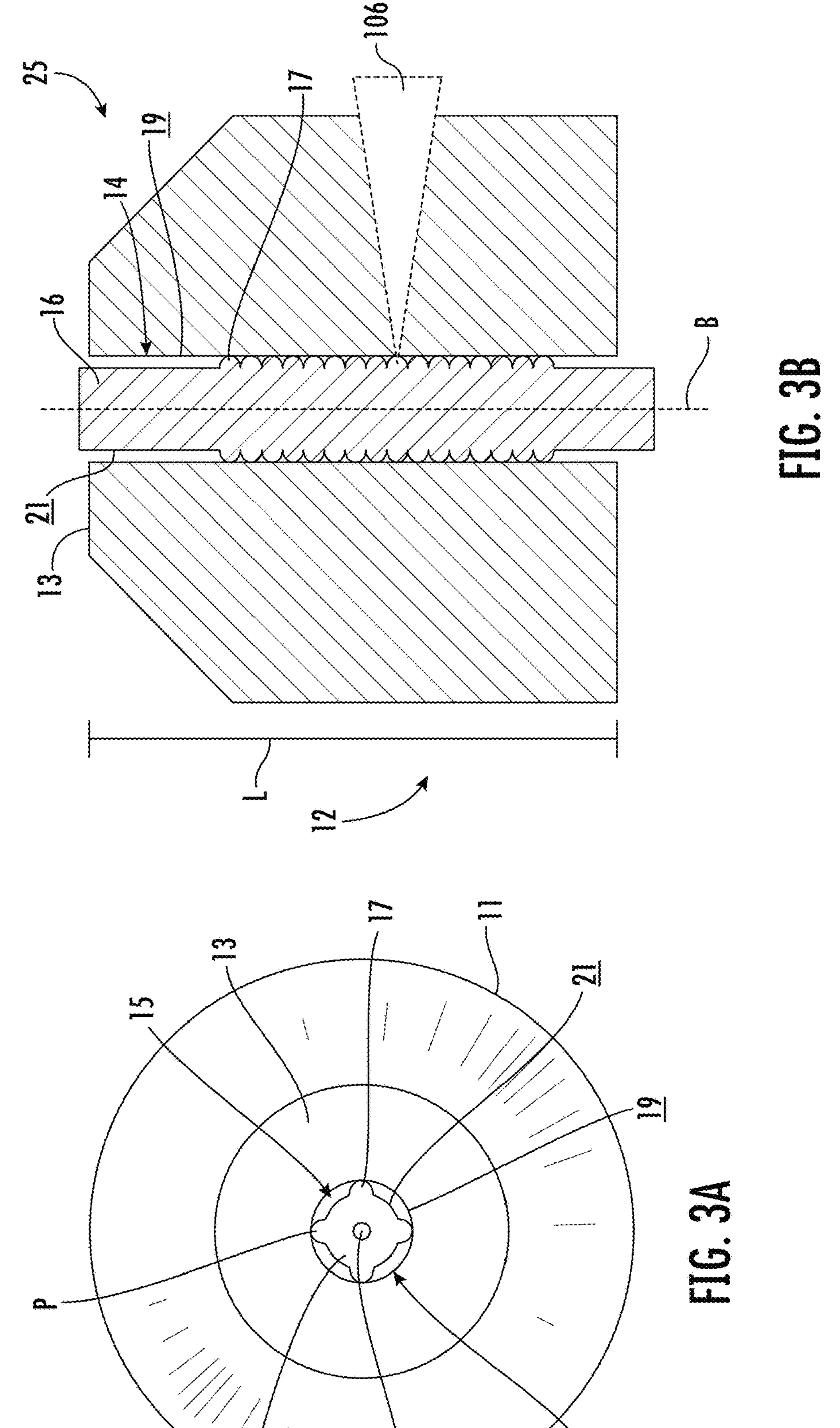
FIG. 3A is a top view of a ferrule assembly having an optical fiber inserted within a ferrule bore of a ferrule, where the optical fiber has been laser treated to secure the optical fiber in accordance with the present disclosure.
FIG. 3B is a cross-sectional side view of the ferrule assembly of FIG. 3A in accordance with the present disclosure.

Referring now to FIGS. 3A and 3B, ferrule assembly 25 is shown where protrusions 17 extend from outer surface 21 of optical fiber 16. In particular, protrusions 17 extend outwardly into and through annular gap 15 and toward inner surface 19 of micro-bore 14. As shown, protrusions 17 contact inner surface 19 of micro-bore 14 of ferrule 12 such that an outward force is applied onto inner surface 19 of micro-bore 14 thereby locking optical fiber 16 in place within micro-bore 14 via interference fit. In particular, in this embodiment, there are four protrusions 17 each about 90 degrees apart relative to each other along a circumference of outer surface 21; the protrusion also extend along at least a portion of length L of optical fiber 16. The angular orientation of protrusions 17 provide compressive forces in opposite directions onto inner surface 19 of micro-bore 14 to hold optical fiber 16 in place. In alternate embodiments, protrusions 17 are oriented in a spiral or helical pattern within micro-bore 14.

Protrusions 17 have a height ranging between 100 nanometers (nm) and 800 nm, between 200 nm and 750 nm, or between 200 nm and 400 nm. As used herein, "height" of protrusion 17 refers to the distance from outer surface 21 of optical fiber 16 to an apex P of protrusion 17. In some embodiments, protrusions 17 occupy a portion of the volume of annular gap 15 within micro-bore 14 and contact outer surface 21 of optical fiber 16. In this embodiment, all of the protrusions 17 have substantially the same height. However, in alternate embodiments and as discussed herein, heights of the protrusions 17 may vary. Stated another way, in alternate embodiments, protrusions 17 have asymmetric heights relative to each other.

Referring to FIG. 3B, protrusions 17 are within micro-bore 14 and are not flush with end face 13 of ferrule 12. That is, protrusions 17 are positioned on outer surface 21 of optical fiber 16 and within micro-bore 14 between end face 13 of ferrule 12 and a rear end of micro-bore 14. Stated another way, protrusions 17 are present along a portion of length L of micro-bore 14. It is within the scope of the present disclosure that in alternate embodiments, protrusions 17 are present along the entire length L of micro-bore 14.

Figures 4A, 4B:
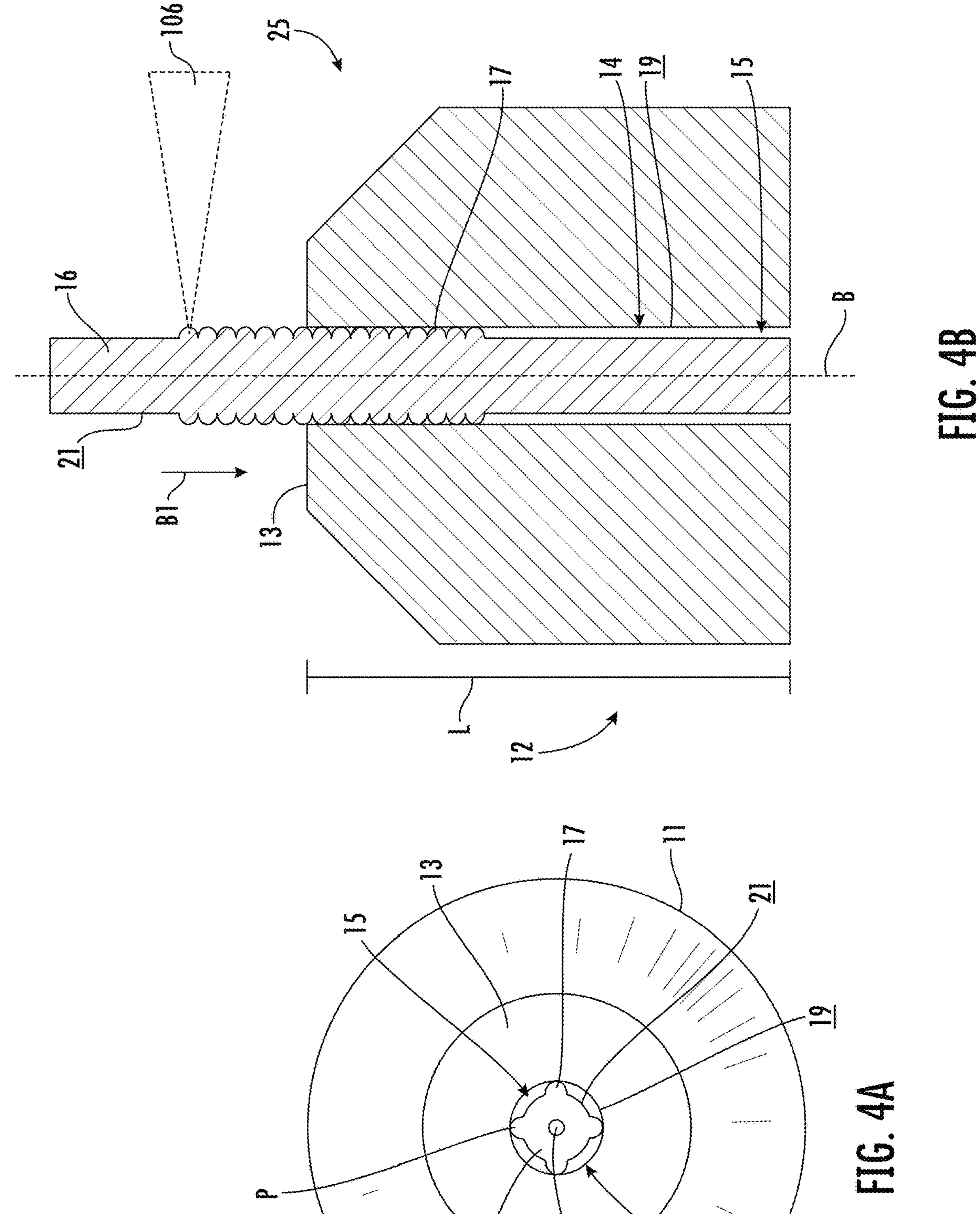
FIG. 4A is a top view of an alternate embodiment of the ferrule assembly where the optical fiber has been laser treated into an alternate configuration to secure the optical fiber in accordance with the present disclosure.
FIG. 4B is a cross-sectional side view of the ferrule assembly of FIG. 4A in accordance with the present disclosure.

Referring now to FIGS. 4A and 4B, ferrule assembly 25, ferrule 12, protrusions 17, and optical fiber 16 are substantially the same as those referenced in FIGS. 3A and 3B except as noted below. FIGS. 4A and 4B show an alternate method of assembling ferrule assembly 25 as discussed in greater detail below. In particular, some of protrusions 17 are positioned outside of ferrule 12 (i.e., beyond end face 13) and the remainder of protrusions 17 are positioned within micro-bore 14 of ferrule 12.

Figures 5A, 5B:
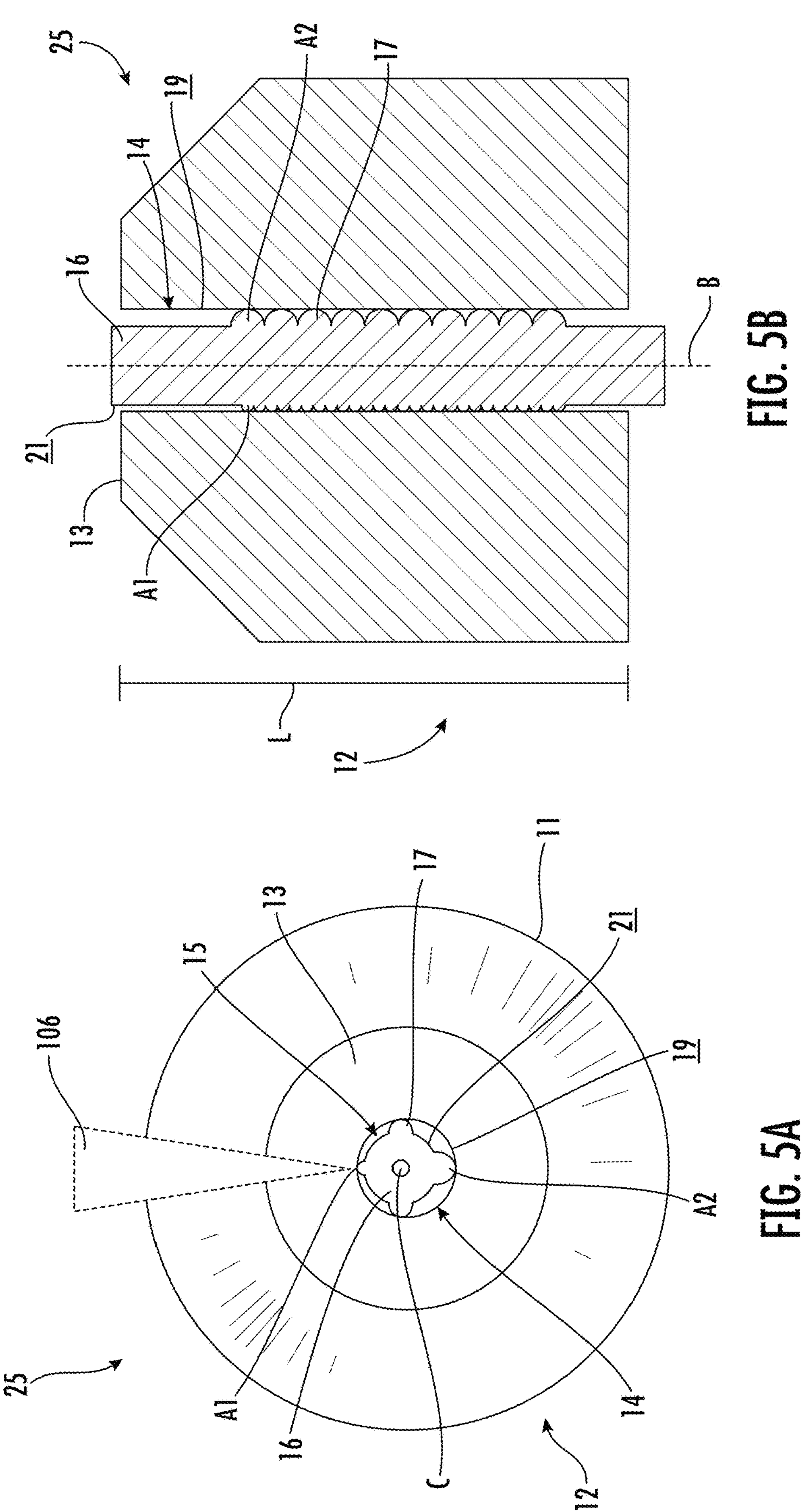
FIG. 5A is a top view of an alternate embodiment of the ferrule assembly where the optical fiber has been laser treated into an alternate configuration to secure the optical fiber in accordance with the present disclosure.
FIG. 5B is a cross-sectional side view of the ferrule assembly of FIG. 5A in accordance with the present disclosure.

Referring now to FIGS. 5A and 5B, ferrule assembly 25, ferrule 12, protrusions 17, and optical fiber 16 are substantially the same as those referenced in FIGS. 3A and 3B except as noted below. FIGS. 5A and 5B show protrusions 17 in a similar pattern as shown in FIGS. 3A and 3B. However, protrusions 17 vary in height about the circumference of optical fiber 16. In some embodiments, protrusion 17 near reference point A1 of micro-bore 14 has a height ranging between 100 nanometers (nm) and 800 nm, between 200 nm and 750 nm, or between 200 nm and 400 nm. In some embodiments, protrusion 17 near reference point A2 of micro-bore 14 has a height ranging between 100 nanometers (nm) and 800 nm, between 200 nm and 750 nm, or between 200 nm and 400 nm. The remaining protrusions 17 have a height within the ranges outlined above with respect to FIGS. 3A and 3B.

The variation in protrusion height among protrusions 17 vary the magnitudes of the forces applied onto optical fiber 16. That is, larger protrusions provide larger magnitudes of force onto ferrule 12. For example, the protrusion 17 near reference point A2 applies a larger force than the opposite protrusion 17 near reference point A1 resulting in optical fiber 16 being positioned closer to reference point A1.

The variation in protrusion height also varies the size of annular gap 15 about the circumference of micro-bore 14. In particular, as shown in FIG. 5A, the size of annular gap 15 near reference point A1 is less than the size of annular gap 15 near reference point A2 that is diametrically opposed to A1. Such configurations can provide advantageous alignment configurations to offset eccentricities, such as core to ferrule eccentricity as discussed in greater detail below. Stated another way, by varying the height of protrusions 17, optical fiber 16 can be shifted within micro-bore 14 such that optical fiber 16 can be in better alignment within the ferrule 12, i.e., offsetting or minimizing any core to ferrule eccentricity that may be present.

An advantage of protrusions 17 formed along outer surface 21 of optical fiber 16 is that optical fiber 16 can directly engage with inner surface 19 of micro-bore 14 to lock optical fiber 16 within ferrule 12 and ferrule assembly 25 (via interference fit) without the use of an adhesive or adhesive material (e.g., a bonding agent). This provides cost savings as fewer materials are needed to assemble connector 10 (i.e., no bonding agent). This also reduces the number of assembly steps as insertion or injection of an adhesive is no longer needed. In addition, as described in greater detail herein, the height of protrusions 17 can be varied such that optical fiber 16 is positioned within ferrule assembly 25 to reduce the eccentricity of ferrule assembly 25.

Laser Apparatus 100

Figure 6:
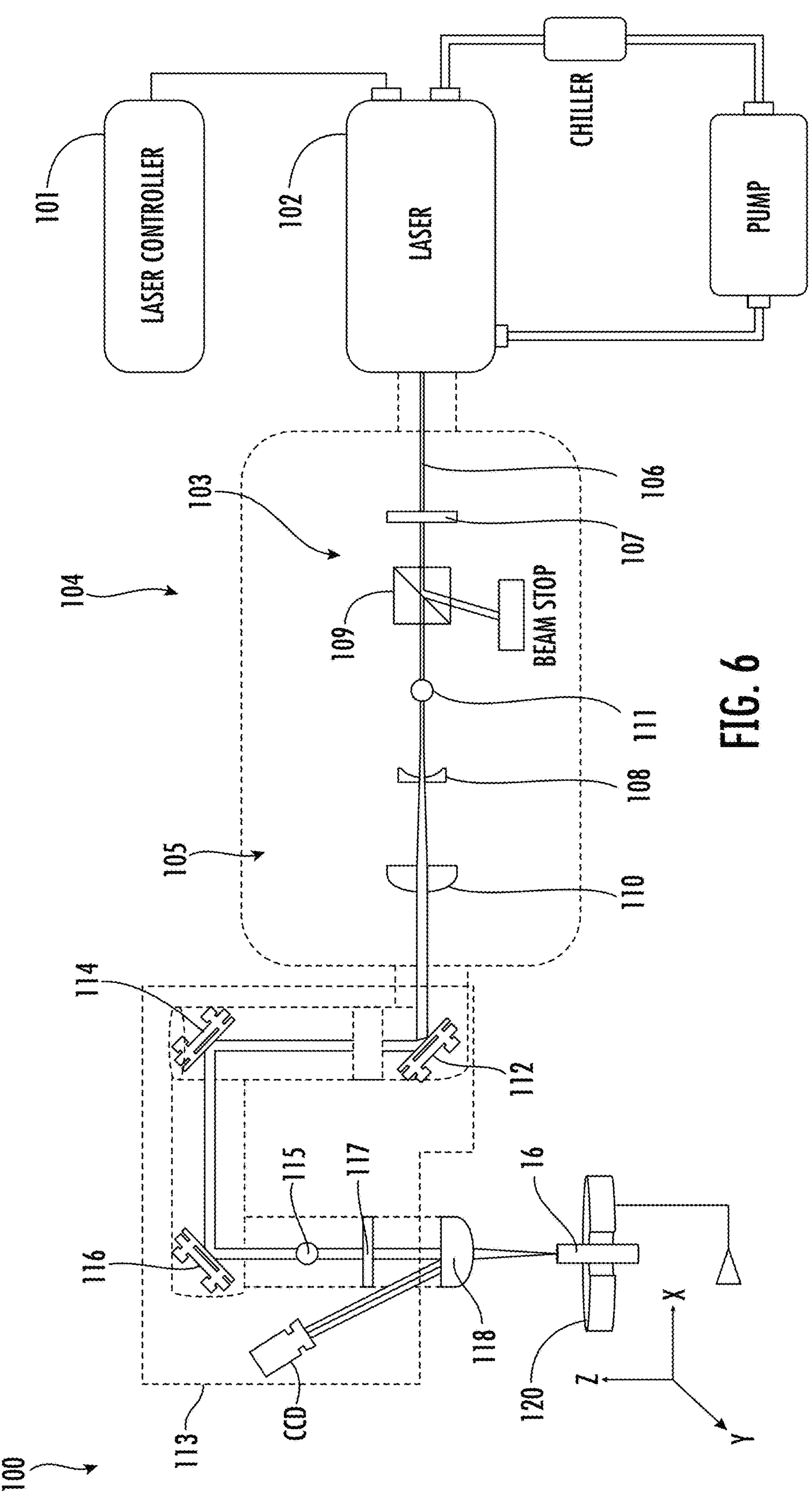
FIG. 6 is a schematic representation of a laser apparatus that is used in accordance with the present disclosure.

Referring now to FIG. 6, a laser apparatus 100 is shown. Laser apparatus 100 is configured to change the surface properties of optical fiber 16 by laser treatment as discussed herein. In particular, as discussed in greater detail herein, laser apparatus 100 applies a laser beam 101 onto ferrule 12 and/or optical fiber 16 to change the surface properties of optical fiber 16 to create protrusions 17 such that optical fiber 16 directly engages with inner surface 19 of micro-bore 14 of ferrule 12.

As shown in FIG. 6, laser apparatus 100 includes a laser 102, an enclosure box 104, a mirror section 113, and a focusing lens 118. Laser 102 is configured to emit a laser beam 106 to treat optical fiber 150 that is seated on stage 120 to create protrusions 17 onto outer surface 21 of optical fiber 16 as discussed herein. The height of protrusion 17 can be controlled by varying the power, tuning wavelength, or changing the focusing position of laser beam 106 on/inside glass substrate 125. In some embodiments, laser 102 emits laser beam 106 at a mid-IR wavelength. In some embodiments, laser 102 emits laser beam 106 at a wavelength ranging between 1 micron and 5 microns, between 2 microns and 3 microns, or between 2.65 microns and 2.85 microns. In some embodiments, laser 102 emits laser beam 106 at a power ranging between 1 Watt (W) and 50 W. In some embodiments, laser 102 emits laser beam 106 with a numerical aperture ranging between 0.01 and 1, between 0.02 and 0.5, or between 0.02 and 0.3. In some embodiments, laser

102 emits laser beam 106 at an exposure time ranging between 0.1 seconds to 10 seconds.

As mentioned previously, laser apparatus 100 includes enclosure box 104. In some embodiments, enclosure box includes a purging gas to avoid absorption of water from other components as shown in FIG. 6 in open air. In some embodiments, the purging gas is Nitrogen. However, it is within the scope of the present disclosure that in alternate embodiments, alternate suitable purging gases may be used. As shown in FIG. 6, enclosure box 104 includes a power attenuation section 103 and a beam expander section 105. Power attenuation section 103 is configured to reduce the power of laser beam 106 and to align laser beam 106 into beam expander section 109. Power attenuation section 103 comprises a waveplate 107, a beam splitter 109, and a diaphragm 111. Waveplate 107 is configured to transmit light and modify the polarization state of the light without attenuating, deviating, or displacing laser beam 106. In some embodiments, waveplate 107 is a half wave plate that is configured to shift the polarization direction of linearly polarized light. After passing through waveplate 107, laser beam 106 passes through a beam splitter 109, which is configured to split the laser beam 106. Stated another way, waveplate 107 and beam splitter 109 cooperate to decrease the power of laser beam 107. As shown, beam splitter 109 splits laser beam 106 such that a portion of laser beam 106 is directed to a beam stop and the remaining portion is directed to diaphragm 111. Diaphragm 111 is configured to re-align the remaining portion of laser beam 106 as laser beam 106 passes through diaphragm 111 and onto beam expander portion 105. In some embodiments, a laser controller 101 can be used to adjust the specifications of laser beam 106 (e.g., laser power, wavelength, etc.).

Beam expander section 105 is configured to expand the remaining portion of laser beam 106 downstream within laser apparatus 100. As shown in FIG. 6, beam expander section 105 comprises a series of lenses 108, 110. Lenses 108, 110 are configured to expand laser beam 106. In some embodiments, lens 108 is a concave lens, and lens 110 is a convex lens. However, it is within the scope of the present disclosure that in alternate embodiments, other types of lenses may be used for lenses 108, 110.

Once laser beam 106 moves through enclosure box 104, laser beam 106 moves to mirror section 113. Mirror section 113 is configured to change the direction of laser beam 106 such that laser beam 106 is redirected in the direction of optical fiber 150. With continued reference to FIG. 6, mirror section 113 comprises mirrors 112, 114, 116; diaphragm 115; and waveplate 117. Mirrors 112, 114, 116 are configured to change the direction of laser beam 106 exiting enclosure box 104. As shown, in some embodiments, mirrors 112, 114, 116 change the direction of laser beam 106 by about 90 degrees upon contact with the mirrors. However, it is within the scope of the present disclosure that alternate angle changes of laser beam 106 by mirrors 112, 114, 116 may be used. After passing through mirrors 112, 114, 116, laser beam 106 passes through a diaphragm 115. Like diaphragm 111, diaphragm 115 is configured to re-align the laser beam 106. After passing through diaphragm 115, laser beam 106 passes through a waveplate 117. Like waveplate 107, waveplate 117 is configured to transmit light and modify the polarization state of the light without attenuating, deviating, or displacing laser beam 106. In some embodiments, waveplate 117 is configured to shift the polarization direction of linearly polarized light (e.g., from a linear polarization state to a circular polarization state). However, it is within the scope of the present disclosure that, in alternate embodiments, waveplate 117 may be omitted from laser apparatus 100.

As shown in FIG. 6, after laser beam 106 passes through mirror portion 113, laser beam 106 passes through a focusing lens 118. Focusing lens 118 is configured to redirect and focus laser beam 106 onto optical fiber 16 that is seated on stage 120. In some embodiments, focusing lens 118 is a convex focusing lens. However, it is within the scope of the present disclosure that, in alternate embodiments, other suitable lens types may be used. In some embodiments, focusing lens 118 has a focal length ranging between 10 mm and 200 mm, between 20 mm and 150 mm, or between 30 mm and 100 mm. In some embodiments, focusing lens 118 has a focal length of about 50 mm. As discussed herein, laser beam 106 that is applied onto optical fiber 16 creates protrusions 17 on outer surface 21 of optical fiber 16.

Method of Assembling Ferrule Assembly 25

To operate laser apparatus 100 and assemble ferrule assembly 25, a connector 10 with optical fiber 16 and ferrule 12 is placed within laser apparatus 100 (e.g., within a V-groove or a stage to hold connector 10 in place). Optical fiber 16 is inserted into micro-bore 14 of ferrule 12. After insertion, laser beam(s) 106 is emitted from laser 102 and travels through apparatus 100 as shown in FIG. 6 such that laser beam(s) 106 contact ferrule 12. In particular, with reference to FIG. 3B, laser beam 106 is transmitted through the material of ferrule 12 (due to the wavelength of laser beam 106 and the material of ferrule 12) such that laser beam 106 treats optical fiber 16 and changes the bulk surface properties of the outer surface 21 of optical fiber 16 to create protrusions 17 as discussed above that extend into annular gap 15 and contact inner surface 19 of micro-bore 14. In some embodiments, ferrule 12 is made of zirconia whereby laser beam 106 is transparent to that material at the wavelengths discussed herein. However, it is within the scope of the present disclosure that in alternate embodiments, alternate suitable materials for ferrule 12 may be used.

In another embodiment and with reference to FIG. 4B, an alternate method of assembling ferrule assembly 25 is provided. In particular, a connector 10 with optical fiber 16 and ferrule 12 is placed within laser apparatus 100 (e.g., within a V-groove or a stage to hold connector 10 in place). Ferrule 12 is pre-heated to expand micro-bore 14 of ferrule 12, and optical fiber 16 is inserted into micro-bore 14 of ferrule 12 while ferrule 12 is in the expanded state such that at least a portion of optical fiber 16 extends beyond the ferrule end face 13 of ferrule 12. After optical fiber 16 is inserted into ferrule 12, laser beam(s) is emitted from laser 102 and travels through apparatus 100 as shown in FIG. 6 such that laser beam(s) 106 contact optical fiber 16. In particular, as shown in FIG. 4B, laser beam 106 is applied onto the portion of optical fiber 16 that extends beyond ferrule end face 13 to create protrusions 17 along outer surface 21 of optical fiber 16 as discussed above, where the protrusions 17 are also beyond ferrule end face 13. Then, laser treated optical fiber 16 is retracted into micro-bore 14 along direction B1 such that the distance between the fiber end face and ferrule end face 13 is controlled. Once optical fiber 16 is positioned relative to ferrule end face 13, ferrule 12 is cooled (e.g., heat is removed), whereby ferrule 12 and micro-bore 14 contract and substantially return to their original shape prior to heating. When ferrule 12 returns to its original shape, protrusions 17 engage with inner surface 19 of micro-bore 14 to create an interference fit thereby direct locking optical fiber 16 into place within ferrule 12.

Properties of Ferrule Assembly 25

As discussed above, protrusions 17 on outer surface 21 of optical fiber 16 enable optical fiber 16 to directly lock into place within micro-bore 14 (via interference fit) and form ferrule assembly 25. Ferrule assembly 25 has certain properties described below.

In some embodiments, ferrule assembly 25 when installed into connector 10 has an insertion loss of less than 0.25 decibels (dB), less than 0.12 dB, or less than 0.05 dB at reference wavelengths between 1310 nanometers (nm) and 1550 nm as measured by methods known in the art. For example, in one embodiment, the reference wavelength is one of 1310 nm, 1490 nm, 1550 nm, and 1625 nm. In some embodiments, connector 10 has an insertion loss of less than 0.25 decibels (dB), less than 0.12 dB, or less than 0.05 dB at a reference wavelength of 1310 nanometers (nm) as measured by methods known in the art. In some embodiments, connector 10 has an insertion loss of less than 0.25 decibels (dB), less than 0.12 dB, or less than 0.05 dB at a reference wavelength of 1550 nanometers (nm) as measured by methods known in the art.

In some embodiments, optical fiber 16 has a fiber movement within connector 10 of less than 30 nanometers (nm), less than 20 nm, or less than 10 nm as measured by the methods disclosed below.

In some embodiments, optical fiber 16 has a pre-thermal cycling fiber pull force of greater than 2 pounds force (lbf) as measured by the method disclosed in IEC 61753.

Eccentricity Correction

The methods described above provide a direct locking mechanism (i.e., interference fit) in which the protrusions 17 of optical fiber 16 lock optical fiber(s) 16 in place within ferrule 12 of ferrule assembly 25. In addition to locking the optical fiber(s) 16 in place, this mechanism can also be used to improve alignment within the ferrule assembly 25 as discussed in greater detail below.

Various embodiments will be further clarified by examples in the description below. In general, the description relates to a method for improving the alignment of optical fibers across an optical connection by minimizing the offset between the inner core of the optical fiber and a fixed mating location on the ferrule of a fiber optic connector. The mating location is the area or portion of the ferrule end face that includes the end of the optical fiber and is configured to engage, confront or otherwise optically "connect" to an optical fiber in the other optical component (e.g., another fiber optic connector). The position of the mating location may depend on several factors, including the type of fiber optic connector. By minimizing the distance or offset (between the inner core of the optical fiber and a fixed mating location on the ferrule of the fiber optic connector), the position of the fiber core becomes more predictably located at or near the intended mating location of the fiber optic connector. Thus, when two fiber optic connectors are mated together such that the intended mating locations engage or confront each other and each of the fiber optic connectors have had the offset minimized, the insertion losses may be minimized since the respective inner cores of the optical fibers in the connectors are more likely to be aligned or more closely aligned than if the offsets were not minimized. The method in accordance with the present disclosure minimizes the offset between the fiber core and the mating location on the ferrule in a straightforward manner. In this regard, the reduction in insertion losses across an optical connection in accordance with aspects of the present disclosure may be achieved with existing materials, parts, and with minimal changes to current manufacturing techniques. Thus, the resulting reduction in insertion losses across an optical connection may be achieved in a cost-effective manner.

Figure 7:
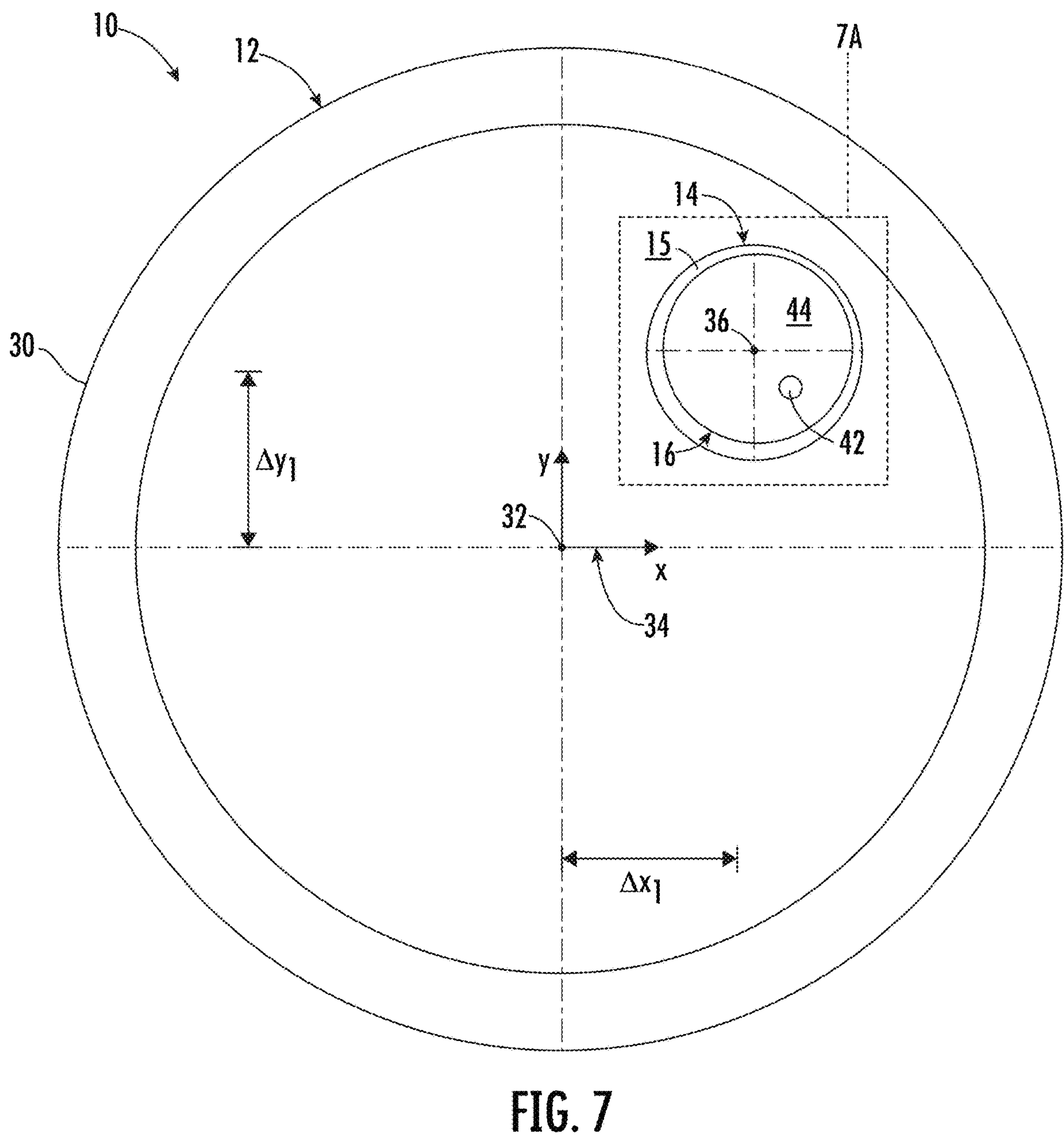
FIG. 7 is a schematic illustration of a typical end face of a ferrule of a fiber optic connector having an optical fiber positioned in a micro-bore of the ferrule.
Figure 7A:
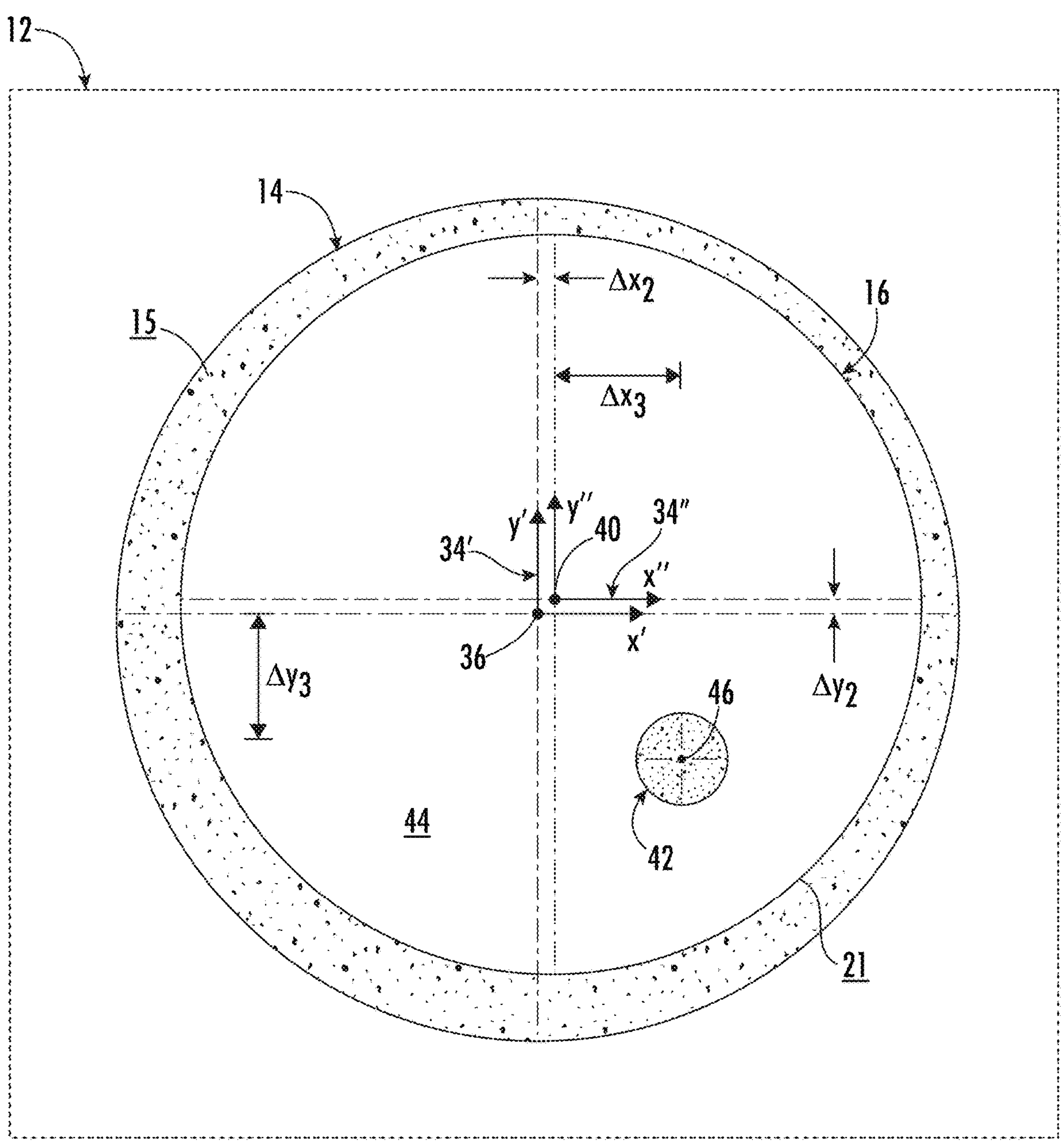
FIG. 7A is an enlarged schematic illustration of the area 7A shown in FIG. 7.

FIGS. 7 and 7A are schematic illustrations of an exemplary geometry at a tip of a fiber optic connector, such as fiber optic connector 10 illustrated in FIG. 1. The ferrule 12 includes an outer surface 30 that defines a center 32 (referred to as ferrule center 32). For purposes of discussion, a coordinate system 34 may be positioned at ferrule center 32 that defines orthogonal axes x and y (e.g., a Cartesian coordinate system). As explained above, the ferrule 12 includes a micro-bore 14 that is configured to receive the bare optical fiber 16. Ideally, the micro-bore 14 would be located such that the center 36 of the micro-bore 14 (referred to as bore center 36) coincides with the ferrule center 32. A coordinate system 34' may be positioned at bore center 36 that defines orthogonal axes x' and y'. Due to inherent tolerance variations in the materials and manufacturing processes, however, the micro-bore 14 is typically offset from the ferrule center 32 by some amount $\Delta x_1$, $\Delta y_1$. The optical fiber 16 is configured to be positioned in the micro-bore 14 and secured within the micro-bore 14 using a suitable method as discussed herein. In current manufacturing methods, the micro-bore 14 is oversized relative to the optical fiber 16 such that the center 40 of the optical fiber 16 (referred to as fiber center 40) is typically offset from the bore center 36 by some amount $\Delta x_2$, $\Delta y_2$. Moreover, and as noted above, the optical fiber 16 includes an inner core 42 and an outer cladding 44. Ideally, the inner core 42 would be located such that the center 46 of the inner core 42 (referred to as core center 46) coincides with the fiber center 40. A coordinate system 34" may be positioned at fiber center 40 that defines orthogonal axes x" and y". Due to inherent tolerance variations in the materials and manufacturing processes, however, the core center 46 is typically offset from the fiber center 40 by some amount $\Delta x_3$, $\Delta y_3$.

As demonstrated above, the position of the inner core 42 of the optical fiber 16 relative to the mating location of the ferrule 12 may have a wide range of variance. That variation is influenced at least in part by: i) the position of the micro-bore 14 within the ferrule 12; ii) the position of the optical fiber 16 within the micro-bore 14; and iii) the position of the inner core 42 within the optical fiber 16. The challenge for reducing insertion losses is to locate the core center 46 as close as possible to the mating location on the ferrule 12 given the variations present in current materials and manufacturing techniques. In an exemplary embodiment, the ferrule center 32 may operate as the mating location of the ferrule 12, and the description below is premised on minimizing the offset between the center 46 of the inner core 42 and the center 32 of the ferrule 12. This offset is referred to as the core-to-ferrule offset and indicates the deviation in the position of the inner core 42 from its intended position (i.e., at the mating location). While the description below provides the mating location at the ferrule center 32, it should be recognized that aspects of the present disclosure also apply to embodiments where the mating location is not at the ferrule center 32 but at some other point on the ferrule 12 offset from the center 32. The goal would then be to minimize the offset between the core center 46 and the off-center mating location of the ferrule in that embodiment.

Figure 8:
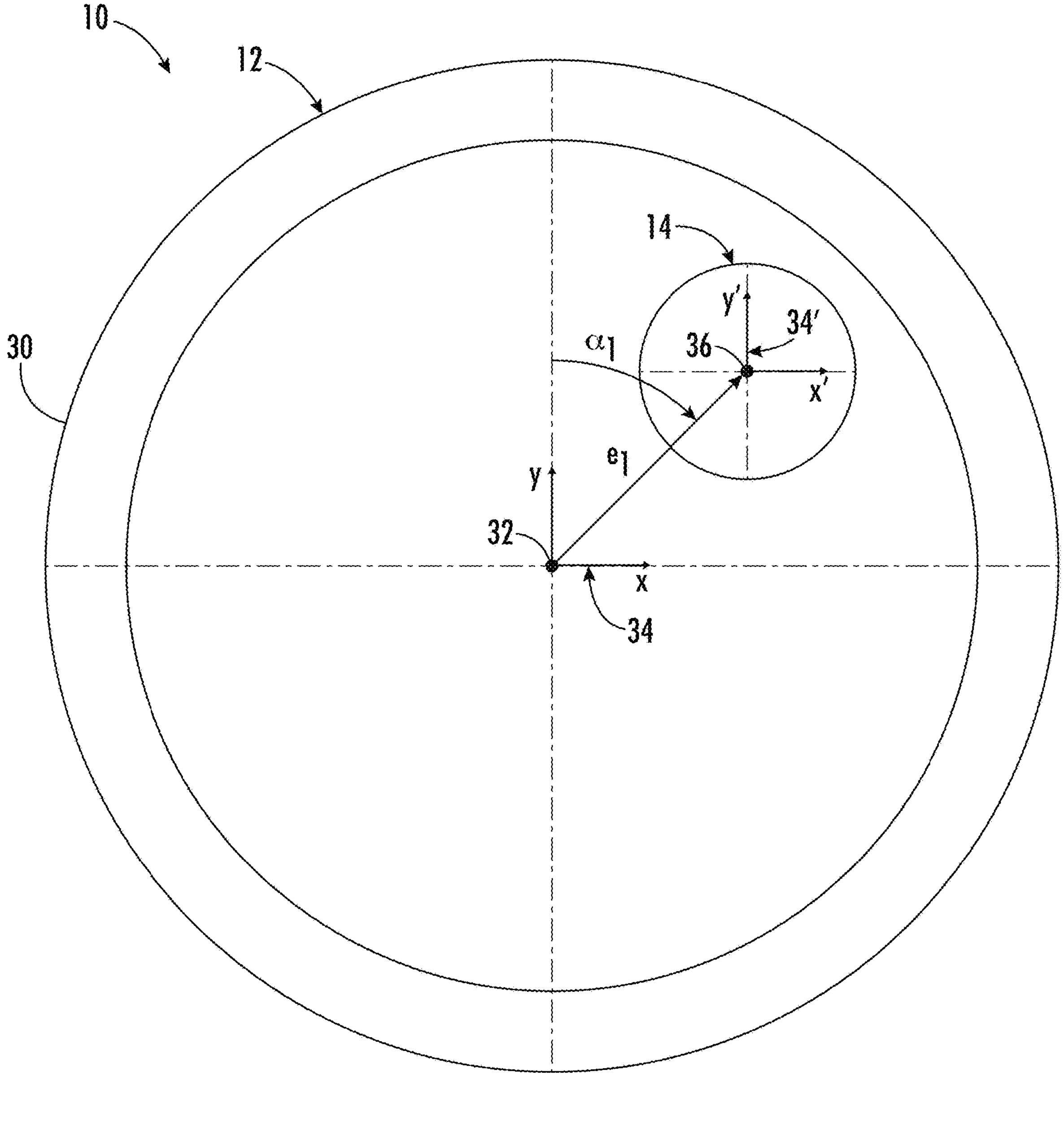
FIG. 8 is a schematic illustration of an end face of a ferrule of fiber optic connector showing a bore offset.

FIGS. 8-11 generally describe a method for minimizing the distance between the center 46 of the inner core 42 and the center 32 of the ferrule 12 (the core-to-ferrule offset) taking into account variations in the micro-bore 14 position within the ferrule 12 and variations in the inner core 42 position within the optical fiber 16 (i.e., numerals i) and iii) listed above). FIG. 8 is a schematic illustration of a ferrule 12 having an off-center micro-bore 14. The ferrule 12 includes an outer surface 30 that defines the center 32 of the ferrule 12. The coordinate system 34 is shown having its origin at the center 32 of the ferrule 12. The position of the center 36 of the micro-bore 14 relative to the center 32 of the ferrule 12 may be characterized by a radial distance $e_1$ and a reference angle $\alpha_1$. Thus, the center 36 of the micro-bore 14 may be positioned at ($e_1$, $\alpha_1$) in cylindrical coordinates. The value e is referred to as the eccentricity and a is referred to as the bearing angle. The bore eccentricity is relative to the center 32 of the ferrule 12 and the bore bearing angle is relative to a reference axis, which may be the vertical axis (i.e., the positive y axis in FIG. 4). Other reference axes, however, may be possible.

Figure 9:
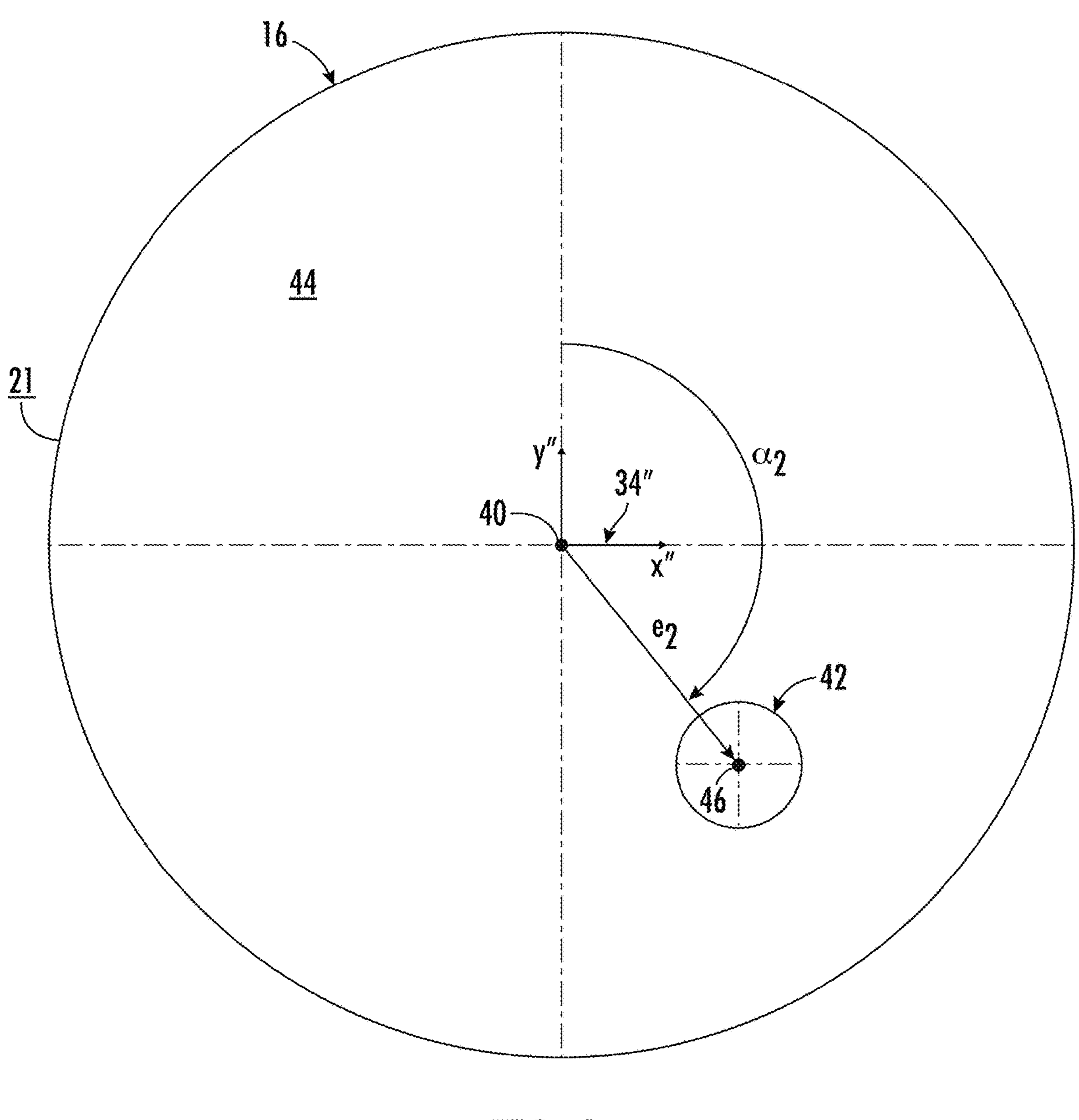
FIG. 9 is a schematic illustration of an end of an optical fiber showing a core offset.

In a similar manner, FIG. 9 is a schematic illustration of an optical fiber 16 having an off-center inner core 42. The optical fiber 16 includes an outer surface 21 that defines the center 40 of the optical fiber 16. The coordinate system 34" is shown having its origin at the center 40 of the optical fiber 16. The position of the core center 46 of the inner core 42 relative to the fiber center 40 may be characterized by eccentricity $e_2$ and bearing angle $\alpha_2$. Thus, the core center 46 of the inner core 42 may be positioned at ($e_2$, $\alpha_2$) in cylindrical coordinates. The core eccentricity is relative to the center 40 of the optical fiber 16 and the core bearing angle is relative to a reference axis, which may be the vertical axis (i.e., the positive y" axis in FIG. 11).

Figure 10:
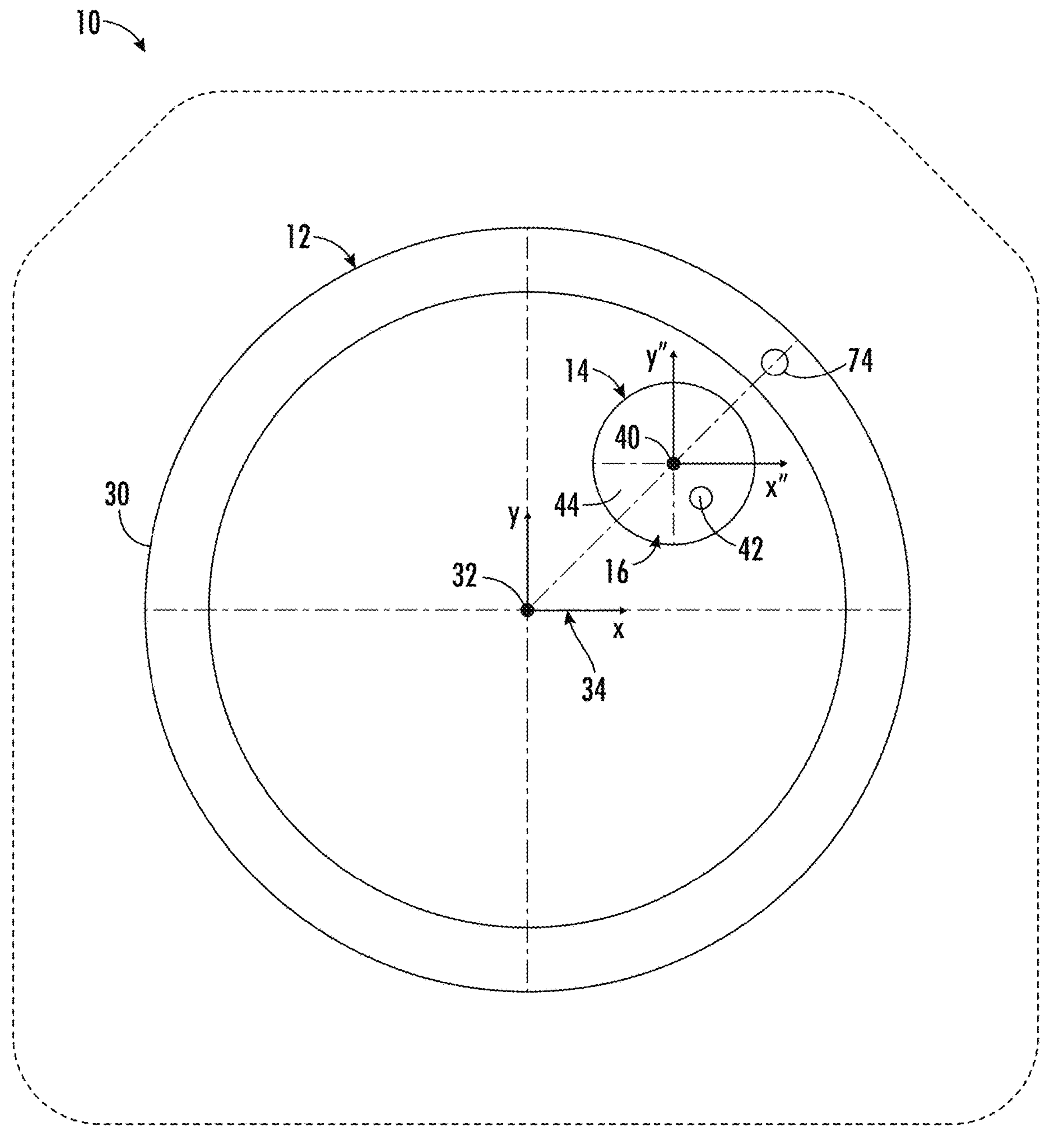
FIG. 10 is a schematic illustration of the end of the fiber optic connector with the optical fiber positioned in the micro-bore of the ferrule.

FIG. 10 illustrates the optical fiber 16 positioned within the micro-bore 14 with the ferrule 12 and the optical fiber 16 in the same orientation as provided in FIGS. 8 and 9, respectively, and ignoring any offset due to the position of the optical fiber 16 in the micro-bore 14. While the eccentricities of the micro-bore 14 and the inner core 42 relative to the ferrule center 32 and fiber center 40, respectively, are fixed for a given ferrule 12 and optical fiber 16 pair, the relative orientation of the ferrule 12 and the optical fiber 16 may be manipulated in order to minimize the core-to-ferrule offset. More particularly, if the bearing angles $\alpha_1$ and $\alpha_2$ are arranged about 180 degrees apart and the inner core 42 is radially inboard of the fiber center 40, then the distance between the core center 46 and the ferrule center 32 will be minimized. This means that given a particular ferrule 12 and optical fiber 16 pair, the inner core 42 can be positioned as close as possible to the intended mating location of the ferrule 12 of fiber optic connector 10.

Figure 11:
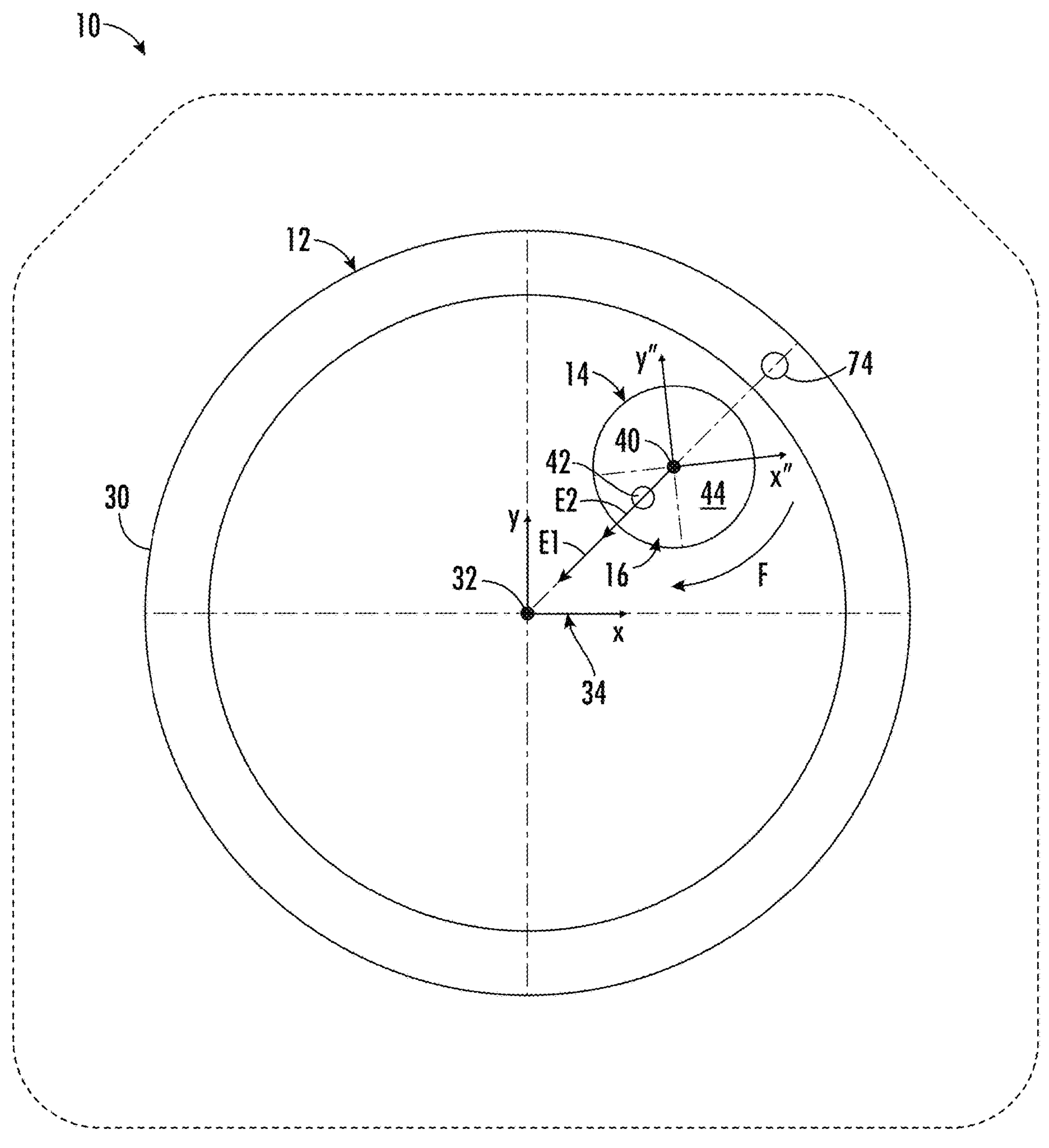
FIG. 11 is a schematic illustration of the fiber optic connector of FIG. 10 with the core-to-ferrule offset minimized by rotating the optical fiber.

FIG. 11 illustrates the optical fiber 16 positioned within the micro-bore 14 with the ferrule 12 and the optical fiber 16 having an orientation such that the reference axis of the ferrule 12 and the reference axis of the optical fiber 16 are substantially aligned and such that the bearing angles $\alpha_1$ and $\alpha_2$ are about 180 degrees apart (e.g., 180 degrees±10 degrees). The arrangement of FIG. 11 may be achieved by maintaining the orientation of the ferrule 12 and rotating the optical fiber 16 to achieve about a 180-degree difference in the bearing angles $\alpha_1$, $\alpha_2$ (demonstrated by arrow F). In a further alternative embodiment (not shown), both the ferrule 12 and the optical fiber 16 may be rotated to achieve the about 180-degree difference in the bearing angles $\alpha_1$, $\alpha_2$. In a further alternative embodiment (not shown), the orientation of optical fiber 16 is maintained while the ferrule 12 (or alternatively the entire fiber optic connector 10) is rotated about its central axis to achieve about a 180-degree difference in the bearing angles $\alpha_1$, $\alpha_2$. For example, in one exemplary embodiment, the ferrule 12 may be rotated such that micro-bore 14 is positioned upwardly from the ferrule center 32 (i.e., $\alpha_1$ is 0 degrees) and the optical fiber 16 may be rotated such that the inner core 42 is positioned downwardly from the fiber center 40 (i.e., $\alpha_2$ is about 180 degrees). In a further embodiment, the ferrule 12 may be rotated before it is installed into the fiber optic connector such that micro-bore 14 is positioned upwardly (or other preferred direction with respect to an orientation key on the fiber optic connector) and the optical fiber 16 may be rotated such that the inner core 42 is positioned opposite to the direction of the micro-bore 14. As described more fully below, the relative rotations between the optical fiber 16 and the ferrule 12 in order to achieve the about 180-degree difference in the bearing angles $\alpha_1$, $\alpha_2$ may be prior to the insertion of the optical fiber 16 in the micro-bore 14 of the ferrule 12.

The method outlined above takes into account the offset in the position of the micro-bore 14 within the ferrule 12 and the offset of the inner core 42 within the optical fiber 16 to minimize the core-to-ferrule offset. Thus, the inner core 42 is positioned as close as possible to the intended mating location of the ferrule 12 (and fiber optic connector 10) given a particular ferrule 12 and optical fiber 16 pairing. In other words, the inner core 42 is positioned as close as possible to the fixed, known location where the fiber optic connector 10 is expected to connect to another optical component. Thus, it is believed that the insertion losses associated with the optical connection between the fiber optic connector 10 as modified by the present disclosure and the other optical component will be reduced. That is, if the optical component to which the fiber optic connector 10 is configured to mate has also been "optimized" in the manner described above, then it is believed that a further reduction in the insertion losses across the optical connection will be achieved. For example, if the other optical component is another optical connector similar to fiber optic connector 10, then the core-to-ferrule offset for the other fiber optic connector may be similarly minimized. Thus, for each of the fiber optic connectors being mated across the optical connection, the inner cores 42 are as close as possible to their intended mating location and the insertion losses across the optical connection will be reduced, and perhaps significantly reduced, compared to current fiber optic connectors (made according to conventional manufacturing techniques) and randomly mated across an optical connection.

In a further aspect of the present disclosure, the variance as a result of the position of the optical fiber 16 within the micro-bore 14 (i.e., numeral ii) listed above and identified by $\Delta x_2$, $\Delta y_2$ (FIG. 7A)) may be reduced or eliminated. It is believed that reducing or eliminating this variance will further reduce the insertion losses across an optical connection. Stated another way, due to the variance, there may be an eccentricity vector still present within connector 10, and additional method(s) may be employed to reduce the eccentricity vector. More particularly, one aspect of the method may include providing an interference fit between the optical fiber 16 and the micro-bore 14. Such an interference fit essentially eliminates any play that might exist in positioning the optical fiber 16 within the micro-bore 14 and any potential offsets as a result of that play. Another aspect of the method may include implementing bulk surface changes to optical fiber 16 by laser treatment in accordance with the methods described herein such that optical fiber 16 engages with inner surface 19 of micro-bore 14 to reduce the variance of the position of optical fiber 16 within micro-bore 14. In particular, with reference to FIG. 11, the heights of protrusions 17 along outer surface 21 of optical fiber 16 may be varied (FIGS. 5A and 5B) such that optical fiber 16 is shifted within micro-bore 14 and into a position where the magnitude of eccentricity vector E1 is reduced to a magnitude of eccentricity vector E2 as shown in FIG. 11. Similarly, the shape of micro-bore 14 may be altered (as shown in FIGS. 6A and 6B for example) to shift optical fiber 16 within micro-bore 14 and into a position where the magnitude of eccentricity vector E1 is reduced to a magnitude of eccentricity vector E2 as shown in FIG. 11.

Optical fiber(s) may have a greater absorption within the water peak absorption wavelength (i.e., around 2.73 microns) or within the mid IR wavelength range. Thus, when laser treating the ferrule with the mid IR laser beams to lock the optical fiber in the ferrule, the optical fiber may absorb some of the mid IR laser beams such that the optical fiber undergoes a slight polish and edge rounding without distortion of the fiber core to produce an additional locking effect within the ferrule.

It will be apparent to those skilled in the art that various modifications to the preferred embodiments of the disclosure as described herein can be made without departing from the spirit or scope of the disclosure as defined in the appended claims.

Thus, the disclosure covers the modifications and variations provided they come within the scope of the appended claims and the equivalents thereto.

What is claimed is:

1. A ferrule assembly comprising:

a ferrule having a front end, a rear end, and a ferrule bore extending between the front end and the rear end, wherein at least a portion of the ferrule bore comprises a micro-bore, and an optical fiber inserted into the micro-bore to define an annular gap between an outer surface of the optical fiber and an inner surface of the micro-bore, the optical fiber comprising at least one protrusion extending from the outer surface of the optical fiber;

wherein the at least one protrusion extends through the annular gap and contacts the inner surface of the micro-bore.

2. The ferrule assembly of claim 1, wherein the at least one protrusion applies a force onto the inner surface of the micro-bore such that the optical fiber has a pull force of at least 2 pounds-force (lbf) as measured by IEC61753.

3. The ferrule assembly of claim 1, wherein the at least one protrusion comprises a plurality of protrusions spaced apart from each other by 90 degrees along a circumference of the outer surface.

4. The ferrule assembly of claim 1, wherein the at least one protrusion comprises a plurality of protrusions that spans a circumference of the inner surface.

5. The ferrule assembly of claim 1, wherein at least one of the at least one protrusion is outside the micro-bore.

6. The ferrule assembly of claim 5, wherein the at least one of the at least one protrusion is outside the ferrule.

7. The ferrule assembly of claim 1, wherein the at least one protrusion has a height ranging between 100 nm and 800 nm relative to the outer surface of the optical fiber.

8. The ferrule assembly of claim 1, wherein the optical fiber includes an inner cladding and an outer cladding, wherein the inner cladding has a hydroxyl concentration ranging between 0 ppm and 25 ppm, and wherein the outer cladding has a hydroxyl concentration ranging between 10 ppm and 1200 ppm.

9. The ferrule assembly of claim 1, wherein the ferrule assembly is housed within a housing and a connector body.

10. A method of terminating an optical fiber with a ferrule, wherein the ferrule having a front end, a rear end, and a ferrule bore extending between the front end and the rear end, wherein at least a portion of the ferrule bore defines a micro-bore, the method comprising:

inserting the optical fiber into the micro-bore; and applying a laser treatment onto the optical fiber to create at least one protrusion along an outer surface of the optical fiber, wherein the at least one protrusion contacts an inner surface of the micro-bore.

11. The method of claim 10, wherein the inserting the optical fiber into the micro-bore defines an annular gap between the outer surface of the optical fiber and the inner surface of the micro-bore, and wherein applying the laser treatment results in the at least one protrusion extending through the annular gap.

12. The method of claim 10, wherein the at least one protrusion comprises a plurality of protrusions spaced apart from each other by 90 degrees along a circumference of the outer surface.

13. The method of claim 10, wherein the at least one protrusion comprises a plurality of protrusions that spans a circumference of the outer surface.

14. The method of claim 10, wherein the at least one protrusion has a height ranging between 100 nm and 800 nm relative to the outer surface of the optical fiber.

15. The method of claim 10, wherein the optical fiber includes an inner cladding and an outer cladding, wherein the inner cladding has a hydroxyl concentration ranging between 0 ppm and 25 ppm, and wherein the outer cladding has a hydroxyl concentration ranging between 10 ppm and 1200 ppm.

16. The method of claim 10, further comprising:

heating the ferrule such that the micro-bore expands, wherein the inserting of the optical fiber occurs after heating;

cooling the ferrule such that the micro-bore contracts onto the at least one protrusion.

17. The method of claim 10, wherein the laser treatment comprises:

irradiating one or more locations on the optical fiber with a laser beam having a wavelength ranging between 1 micron and 5 microns.

18. The method of claim 17, wherein the laser beam has a power output ranging between 1 W and 50 W.

19. The method of claim 10, wherein the optical fiber is secured to the ferrule after the at least one protrusion contacts the micro-bore of the ferrule to form a terminated assembly, the terminated assembly having a pull force of at least 2 pounds-force (lbf) as measured by IEC61753.

20. A method of terminating an optical fiber having an inner core with a ferrule having a micro-bore and an end face with a mating location, the method comprising:

determining a bore bearing angle of a bore offset of the micro-bore in the ferrule at the end face relative to a reference axis of the ferrule;

determining a core bearing angle of a core offset of the inner core in the optical fiber at an end of the optical fiber relative to a reference axis of the optical fiber;

orienting the ferrule and the optical fiber relative to each other so that the reference axis of the ferrule and the reference axis of the optical fiber are substantially aligned and so that the bore bearing angle and the core bearing angle are arranged about 180 degrees apart;

heating the ferrule at a processing temperature above room temperature;

inserting the optical fiber into the micro-bore of the ferrule when the ferrule is at the processing temperature, wherein a distance exists between a center of the inner core of the optical fiber and the mating location of the ferrule;

applying a laser treatment onto the optical fiber to reduce the distance between the inner core of the optical fiber and the mating location of the ferrule, wherein the optical fiber is altered by the laser treatment; and coupling the optical fiber to the micro-bore of the ferrule.

21. The method of claim 20, wherein the applying a laser treatment step occurs after the inserting step.

22. The method of claim 20, wherein orienting the ferrule and the optical fiber relative to each other further comprises:

fixing the orientation of the optical fiber; and rotating the ferrule about a longitudinal axis of the ferrule.

23. The method of claim 20, wherein orienting the ferrule and the optical fiber relative to each other comprises:

fixing the orientation of the ferrule; and rotating the optical fiber about a longitudinal axis of the optical fiber.

24. The method of claim 20, wherein orienting the ferrule and the optical fiber relative to each other comprises rotating the ferrule and the optical fiber about the respective central axes of the ferrule and the optical fiber.

25. The method of claim 20, wherein the step of orienting the ferrule and the optical fiber relative to each other occurs before the step of inserting the optical fiber into the micro-bore.

26. The method of claim 20, wherein the step of orienting the ferrule and the optical fiber relative to each other occurs after the step of inserting the optical fiber into the micro-bore.

27. The method of claim 26, wherein the altering step comprises creating at least one protrusion on the outer surface of the optical fiber, wherein the at least one protrusion engages with an inner surface of the micro-bore.

28. The method of claim 20, wherein the ferrule is housed within a housing and a connector body after the optical fiber is coupled to the ferrule.

29. The ferrule assembly of claim 1, wherein the at least one protrusion is integrally formed on the outer surface of the optical fiber.

* * * * *